United States Patent
Bian et al.

(10) Patent No.: US 10,746,921 B2
(45) Date of Patent: Aug. 18, 2020

(54) STACKED WAVEGUIDE ARRANGEMENTS PROVIDING FIELD CONFINEMENT

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/040,896

(22) Filed: Jul. 20, 2018

(65) Prior Publication Data
US 2020/0026000 A1    Jan. 23, 2020

(51) Int. Cl.
*G02B 6/12*    (2006.01)
*G02B 6/122*   (2006.01)
*G02B 6/10*    (2006.01)

(52) U.S. Cl.
CPC ......... *G02B 6/12002* (2013.01); *G02B 6/107* (2013.01); *G02B 6/12* (2013.01); *G02B 6/1223* (2013.01); *G02B 2006/12061* (2013.01); *G02B 2006/12097* (2013.01)

(58) Field of Classification Search
CPC .......... G02B 6/12; G02B 6/107; G02B 6/122; G02B 6/1223; G02B 6/12002; G02B 2006/12061; G02B 2006/12097
USPC ....................................... 385/14, 28
See application file for complete search history.

(56) References Cited

U.S. PATENT DOCUMENTS

| | | | |
|---|---|---|---|
| 6,393,185 B1 | 5/2002 | Deacon | |
| 6,526,203 B1 | 2/2003 | Gonzalez et al. | |
| 6,785,434 B2 | 8/2004 | Castoldi et al. | |
| 6,985,648 B2 | 1/2006 | Kish, Jr. et al. | |
| 7,352,942 B2* | 4/2008 | Feng | B82Y 20/00 385/129 |
| 7,373,067 B2* | 5/2008 | Blauvelt | G02B 6/12002 385/131 |
| 7,526,151 B1* | 4/2009 | Little | G02B 6/136 385/129 |

(Continued)

FOREIGN PATENT DOCUMENTS

CN    102608701 A  *  7/2012  ............. G02B 6/122

OTHER PUBLICATIONS

Song, et al., "High-density waveguide superlattices with low crosstalk" Nature Communications vol. 6, Article No. 7027 (2015).

(Continued)

*Primary Examiner* — Robert Tavlykaev
(74) *Attorney, Agent, or Firm* — Thompson Hine LLP; Francois Pagette

(57) ABSTRACT

Structures including a waveguide arrangement and methods of fabricating a structure that includes a waveguide arrangement. A second waveguide spaced in a lateral direction from a first waveguide, a third waveguide spaced in a vertical direction from the first waveguide, and a fourth waveguide spaced in the vertical direction from the second waveguide. The third waveguide is arranged in the lateral direction to provide a first overlapping relationship with the first waveguide. The fourth waveguide is arranged in the lateral direction to provide a second overlapping relationship with the second waveguide.

20 Claims, 6 Drawing Sheets

(56) References Cited

U.S. PATENT DOCUMENTS

| | | | | |
|---|---|---|---|---|
| 8,406,595 B2* | 3/2013 | Hayashi | ............ | G02B 6/02042 |
| | | | | 385/123 |
| 2004/0087049 A1* | 5/2004 | Gill | .................... | G02B 6/12007 |
| | | | | 438/31 |
| 2004/0264905 A1* | 12/2004 | Blauvelt | ............ | G02B 6/12002 |
| | | | | 385/131 |
| 2006/0088265 A1* | 4/2006 | Akiyama | ................ | B82Y 20/00 |
| | | | | 385/129 |
| 2008/0253728 A1* | 10/2008 | Sparacin | ................ | B82Y 20/00 |
| | | | | 385/132 |
| 2009/0103873 A1* | 4/2009 | Fujii | ...................... | G02B 6/138 |
| | | | | 385/126 |
| 2011/0129190 A1 | 6/2011 | Fini et al. | | |
| 2016/0231506 A1* | 8/2016 | Jiang | ...................... | G02B 6/122 |
| 2019/0025504 A1* | 1/2019 | Tsujita | ................ | G02B 26/0816 |
| 2019/0033519 A1* | 1/2019 | Tsujita | .................... | G02B 6/122 |
| 2019/0212627 A1* | 7/2019 | Watts | ................... | G02B 6/1223 |
| 2019/0219886 A1* | 7/2019 | Watts | ...................... | G02F 1/225 |

OTHER PUBLICATIONS

Shen et al., "Increasing the density of passive photonic-integrated circuits via nanophotonic cloaking", Nature Communications vol. 7, Article No. 13126 (2016).

Kim et al., "Crosstalk Reduction in a Shallow-Etched Silicon Nanowire AWG", IEEE Photonics Technology Letters, vol. 20, No. 19, Oct. 1, 2008.

Bian et al., "Efficient Cross-talk Reduction of Nanophotonic Circuits Enabled by Fabrication Friendly Periodic Silicon Strip Arrays", Scientific Reports, vol. 7, Article No. 15827 (2017).

Khavasi et al., "Significant crosstalk reduction using all-dielectric CMOS-compatible metamaterials", 2016, IEEE Photonics Technology Letters.

* cited by examiner

STACKED WAVEGUIDE ARRANGEMENTS PROVIDING FIELD CONFINEMENT

BACKGROUND

The present invention relates to photonic chips and, more specifically, to structures including a waveguide arrangement and methods of fabricating a structure that includes a waveguide arrangement.

Photonic chips are capable of being used in many applications and many systems including, but not limited to, data communication systems and data computation systems. A photonic chip integrates optical components, such as waveguides, and electronic components, such as field-effect transistors, into a unified platform. Layout area, cost, and operational overhead, among other factors, may be reduced by integrating both types of components on a single photonic chip.

On-chip communication and sensing may rely on transferring optical signals through waveguides on the photonic chip to other optical components. Optical signals propagate as electromagnetic waves within waveguides using a number of different modes characterized by different properties. The transverse magnetic (TM) mode is dependent upon transverse magnetic waves in which the magnetic field vector is oriented perpendicular to the direction of propagation. The transverse electric (TE) mode is dependent upon transverse electric waves in which the electric field vector is oriented perpendicular to the direction of propagation.

Waveguides, as well as other optical components, may include cores that are fabricated from silicon nitride or single-crystal silicon. Due to relatively weak field confinement within the core, the crosstalk between adjacent waveguides and components that operate in TM modes may be significant. The existence of such crosstalk may hinder efforts to build optical components and circuits with high density.

Improved structures including a waveguide arrangement and methods of fabricating a structure that includes a waveguide arrangement are needed.

SUMMARY

In an embodiment of the invention, a structure includes a first waveguide, a second waveguide spaced in a lateral direction from the first waveguide, a third waveguide spaced in a vertical direction from the first waveguide, and a fourth waveguide spaced in the vertical direction from the second waveguide. The third waveguide is arranged in the lateral direction to provide a first overlapping relationship with the first waveguide. The fourth waveguide is arranged in the lateral direction to provide a second overlapping relationship with the second waveguide.

In an embodiment of the invention, a method includes forming a first waveguide and a second waveguide that is spaced in a lateral direction from the first waveguide, and forming a third waveguide spaced in a vertical direction from the first waveguide and a fourth waveguide spaced in the vertical direction from the second waveguide. The third waveguide is arranged in the lateral direction to provide a first overlapping relationship with the first waveguide. The fourth waveguide is arranged in the lateral direction to provide a second overlapping relationship with the second waveguide.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
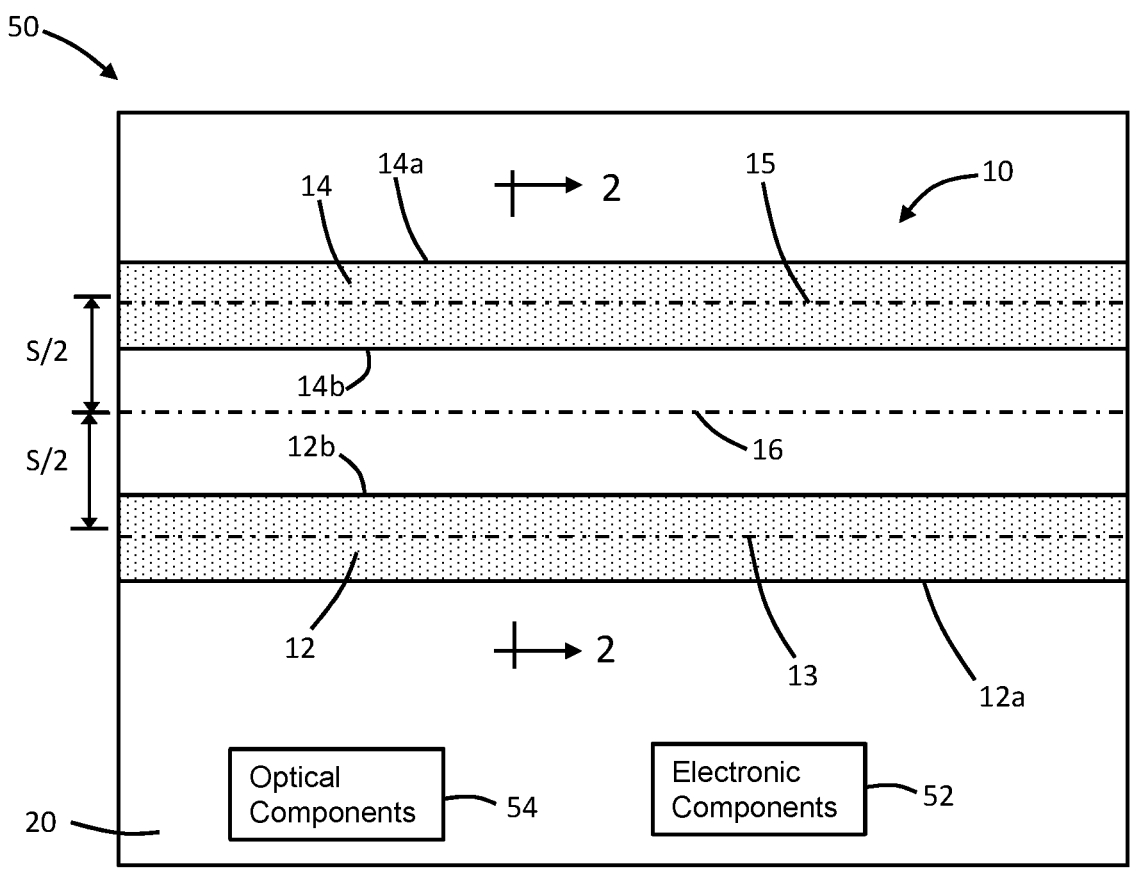
FIG. 1 is a top view of a photonic chip including a waveguide arrangement at a fabrication stage of a processing method in accordance with embodiments of the invention.
Figure 2:
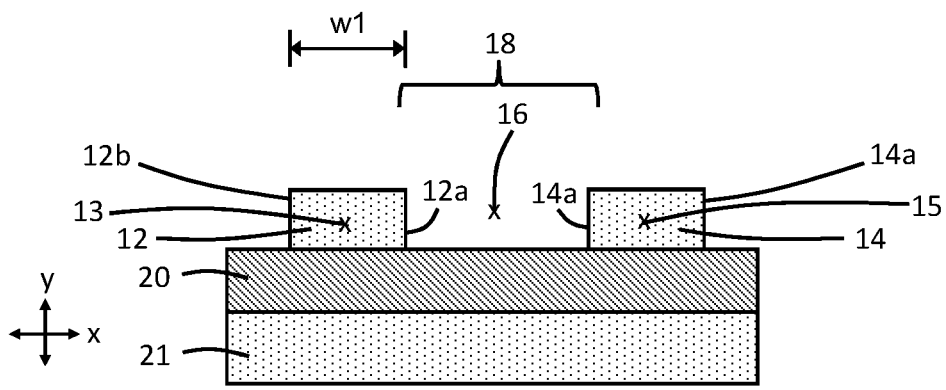
FIG. 2 is a cross-sectional view of the waveguide arrangement taken generally along line 2-2 in FIG. 1.

With reference to FIGS. 1, 2 and in accordance with embodiments of the invention, a structure 10 includes a waveguide 12 and a waveguide 14 that are arranged over a buried oxide (BOX) layer 20 of a silicon-on-insulator (SOI) wafer. The waveguides 12, 14 are composed of single-crystal semiconductor material that is fully etched with a lithography and etching process, and represent cores for the confinement and propagation of optical signals. In an embodiment, the waveguides 12, 14 may be composed of single-crystal silicon originating from a device layer of the SOI wafer and which may be fully etched with the BOX layer 20 providing an etch stop. The BOX layer 20 may be composed of an electrical insulator, such as silicon dioxide (e.g., $SiO_2$), and is arranged over a substrate 21 of the SOI wafer. The substrate 21 may also be composed of single-crystal semiconductor material (e.g., single-crystal silicon).

The waveguide 12 and the waveguide 14 may have a parallel or substantially parallel arrangement, and may be separated by a gap 18 having a centerline 16. A centerline 13 of the waveguide 12 is spaced in a lateral direction from the centerline 16 by a distance, S/2, and a centerline 15 of the waveguide 14 is spaced in the lateral direction from the centerline 16 by a distance, S/2, which means that the centerline 13 of the waveguide 12 is spaced from the centerline 15 of the waveguide 14 in a lateral direction by a distance, S. In other words, the centerlines 13, 15 of the waveguides 12, 14 are arranged in the lateral direction to be equidistant from the centerline 16. The centerline 16 may be aligned parallel to the centerline 13 of waveguide 12 and the centerline 15 of waveguide 14, and each of the waveguides 12, 14 may have a width, w1. The waveguide 12 has opposite side edges 12a, 12b that may be separated by a distance equal to the width, w1, of the waveguide 12. The waveguide 14 has opposite side edges 14a, 14b that may be separated by a distance equal to the width, w1, of the waveguide 14.

Figure 3:
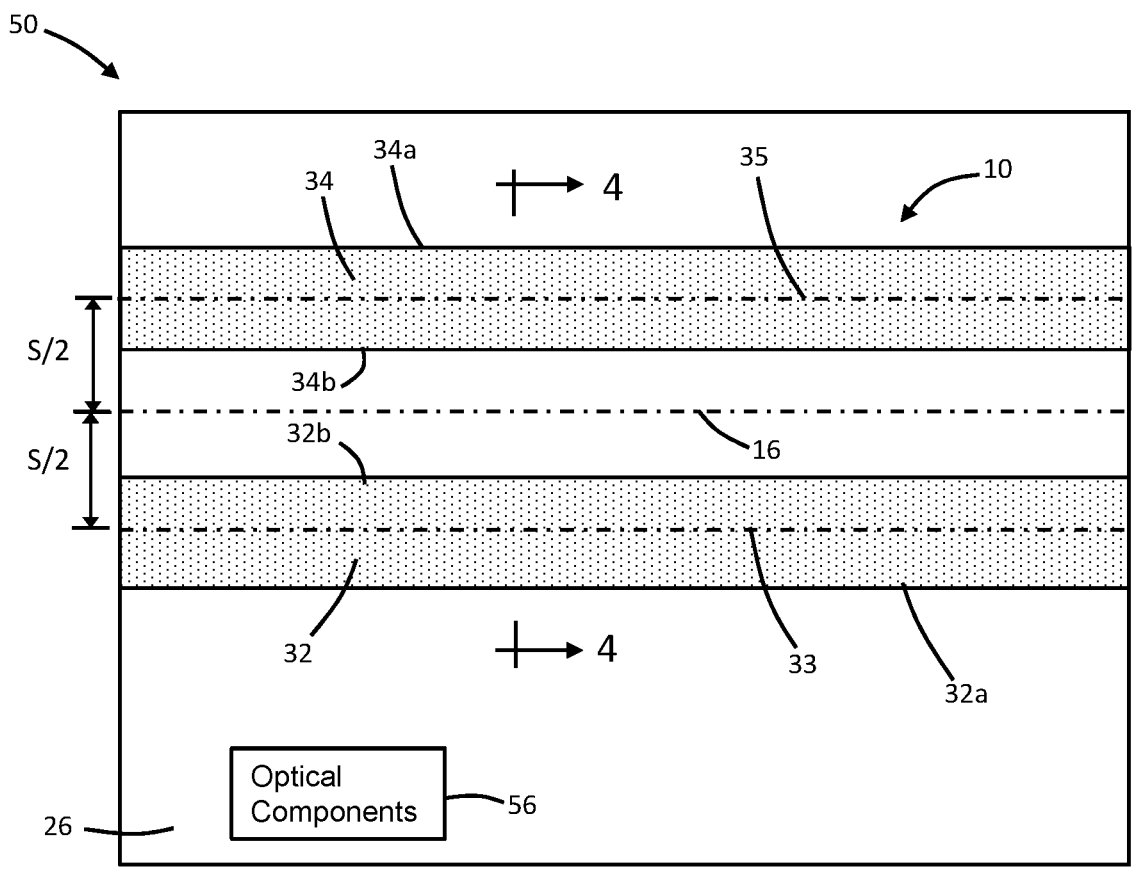
FIG. 3 is a top view of the photonic chip and waveguide arrangement at a fabrication stage of the processing method subsequent to FIG. 1.
Figure 4:
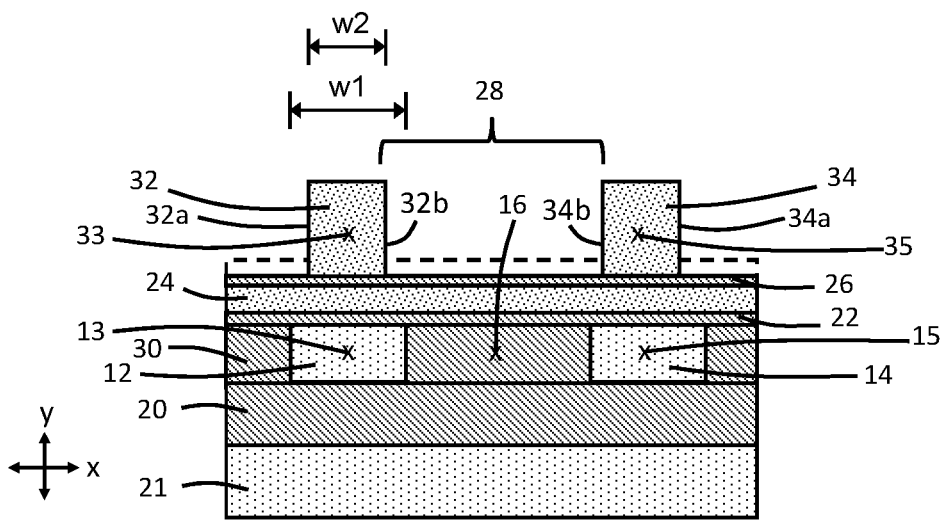
FIG. 4 is a cross-sectional view of the waveguide arrangement taken generally along line 4-4 in FIG. 3.

With reference to FIGS. 3, 4 in which like reference numerals refer to like features in FIG. 2 and at a subsequent fabrication stage of the processing method, a dielectric layer 30 is formed over the structure 10, and fills the gap 18 between the waveguides 12, 14 over the BOX layer 20 and the space around the waveguides 12, 14 over the BOX layer 20. The dielectric layer 30 may be composed of a dielectric material, such as silicon dioxide ($SiO_2$), deposited by chemical vapor deposition (CVD) and planarized with chemical-mechanical polishing (CMP) to be coplanar with a top surface of the waveguides 12, 14.

Dielectric layers 22, 24, 26 are arranged in a multilayer stack on a top surface of the dielectric layer 30. The dielectric layer 22 and the dielectric layer 26 may be composed of a dielectric material, such as silicon dioxide ($SiO_2$), deposited by atomic layer deposition (ALD) or chemical vapor deposition. The dielectric layer 24 may be composed of a dielectric material, such as silicon nitride ($Si_3N_4$), deposited by atomic layer deposition or chemical vapor deposition.

A waveguide 32 and a waveguide 34 are arranged in a vertical direction over the topmost dielectric layer 26. The waveguides 32, 34 may be composed of a dielectric material, such as silicon nitride ($Si_3N_4$), deposited by chemical vapor deposition and patterned by a lithography and etching process from the deposited layer of their constituent dielectric material. The dielectric layers 22, 24, 26 are arranged in the vertical direction between the waveguides 12, 14 and the waveguides 32, 34.

In an alternative embodiment, the etching process used to pattern the dielectric material (e.g., silicon nitride) to form the waveguides 32, 34 may be controlled such that a layer, shown in dashed lines in FIG. 4, of partially-etched dielectric material is arranged on the dielectric layer 26 and connects lower portions of the waveguides 32, 34.

The waveguide 32 and the waveguide 34 may have a parallel or substantially parallel arrangement, and may be spaced relative to the centerline 16 by a gap 28. The waveguides 32, 34 may have a width, w2, that is less than the width of the waveguides 12, 14, and the gap 28 is larger than the gap 18. A centerline 33 of the waveguide 32 spaced in a lateral direction from the centerline 16 by a distance, S/2, and a centerline 35 of the waveguide 34 spaced in a lateral direction from the centerline 16 by a distance, S/2, which means that the centerline 33 of the waveguide 32 is spaced from the centerline 35 of the waveguide 34 in a lateral direction by a distance, S. In other words, the waveguides 32, 34 are also arranged to be equidistant from the centerline 16 such that the waveguide 32 is arranged over the waveguide 12 in an overlapping arrangement and the waveguide 34 is arranged over the waveguide 14 in another overlapping arrangement. In an embodiment, the centerline 33 of waveguide 32 may be arranged directly over the centerline 13 of waveguide 12 and the centerline 33 of waveguide 34 may be arranged directly over the centerline 13 of the waveguide 14.

The waveguide 32 has opposite side edges 32a, 32b that are separated by a distance equal to the width, w2, of the waveguide 32. The waveguide 34 has opposite side edges 34a, 34b that are separated by a distance equal to the width, w2, of the waveguide 34. The width, w2, of the waveguides 32, 34 may be less than the width, w1, of the waveguides 12, 14. Because the waveguides 32, 34 are narrower than the waveguides 12, 14 in the representative embodiment and because of the lateral alignment, the side edges 12a, 12b of the waveguide 12 are both inset inside of the side edges 32a, 32b of the waveguide 32, and the side edges 14a, 14b of the waveguide 14 are both inset inside of the side edges 34a, 34b of the waveguide 34.

Figure 5:
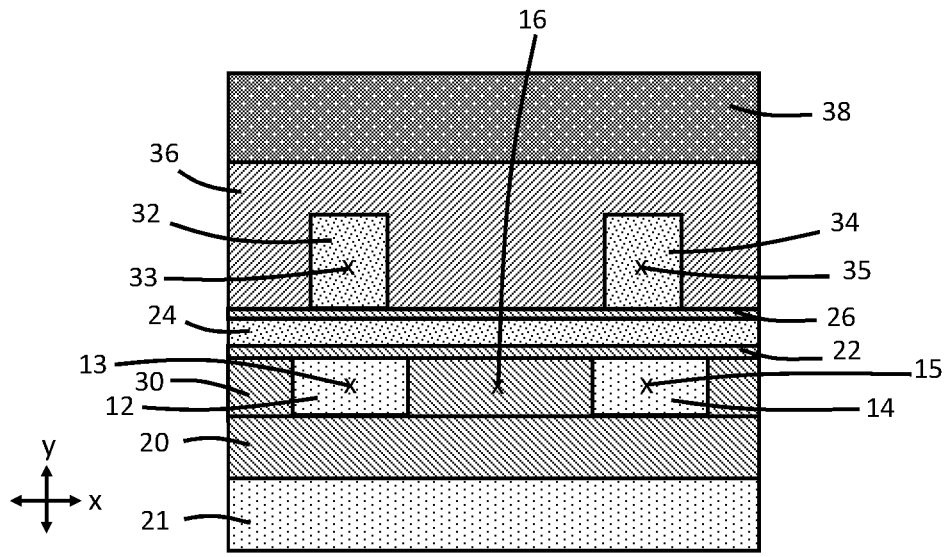
FIG. 5 is a cross-sectional view of the waveguide arrangement at a fabrication stage of the processing method subsequent to FIG. 4.

With reference to FIG. 5 in which like reference numerals refer to like features in FIG. 4 and at a subsequent fabrication stage of the processing method, the structure 10 may further include a dielectric layer 36 that fills the gap between the waveguides 32, 34 over the dielectric layer 26 and the space around the waveguides 32, 34 over the dielectric layer 26. The dielectric layer 36 may be composed of a dielectric material, such as silicon dioxide ($SiO_2$), deposited by chemical vapor deposition using ozone ($O_2$) and tetraethylorthosilicate (TEOS) as reactants and planarized with chemical-mechanical polishing.

A back-end-of-line stack, generally indicated by reference numeral 38, may be formed over the dielectric layer 36. The back-end-of-line stack 38 may include one or more dielectric layers composed of a low-k dielectric material or an ultra-low-k dielectric material. The back-end-of-line stack 38 may also include metallization composed of, for example, copper or cobalt that is arranged in the one or more dielectric layers at locations other than over the structure 10.

The structure 10, in any of its embodiments described herein, may be integrated into a photonic chip 50 (FIGS. 1, 3) that includes electronic components 52 and other types of optical components 54, 56. For example, the photonic chip 50 may integrate one or more photodetectors representing optical components 54 that receive optical signals carried by the waveguides 12, 14, and convert those optical signals into electrical signals that may be processed by the electronic components 52. The electronic components 52 may include field-effect transistors that are fabricated by CMOS front-end-of-line processes using the device layer of the SOI wafer.

The stacked arrangement of the waveguides 12, 14 and waveguides 32, 34 may be effective to reduce crosstalk between the adjacent waveguides 12, 14. The crosstalk reduction may permit the waveguides 12, 14 to be more closely spaced apart and may lead to increases in the packing density of optical components 54 on the photonic chip 50.

In the representative embodiment, the waveguides 32, 34 are dummy structures that are provided for decreasing the spacing between the waveguides 12, 14 that are being used to communicate optical signals on the photonic chip 50. In an alternative embodiment in which the waveguides 32, 34 are being used to communicate optical signals on the photonic chip 50, the waveguides 12, 14 are dummy structures that are provided for decreasing the spacing between the waveguides 32, 34.

Figure 6:
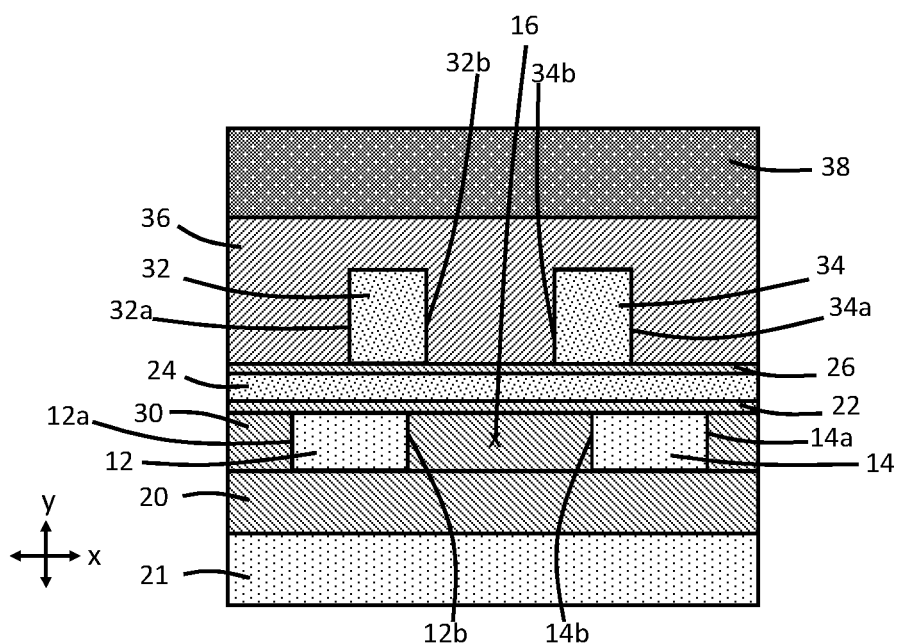
FIGS. 6-11 are cross-sectional views similar to FIG. 5 of waveguide arrangements for a photonic chip in accordance with alternative embodiments of the invention.

With reference to FIG. 6 in which like reference numerals refer to like features in FIG. 5 and in accordance with alternative embodiments of the invention, the waveguides 32, 34 may both be displaced inwardly (i.e., laterally in the x-direction) toward the centerline 16 in order to introduce a lateral misalignment between waveguide 12 and waveguide 32 and a lateral misalignment between waveguide 14 and waveguide 34. The positions of the waveguides 12, 14 are unchanged, but the centerline 33 (FIG. 4) of the waveguide 32 is spaced in a lateral direction from the centerline 16 by a new distance that is less than the distance, S/2, and the centerline 35 (FIG. 4) of the waveguide 34 is spaced in a lateral direction from the centerline 16 by a new distance that is less than the distance, S/2. In an embodiment, the width, w2, of the waveguides 32, 34 is maintained, and only the respective centerlines 33, 35 are shifted. The overlapping relationship between the waveguide 32 and the underlying waveguide 12 is maintained, and the overlapping relationship between the waveguide 34 and the underlying waveguide 14 is also maintained. Specifically, the side edge 32a of the waveguide 32 is arranged between the side edges 12a, 12b of the waveguide 12, and the side edge 34a of the waveguide 34 is arranged between the side edges 14a, 14b of the waveguide 14.

Figure 7:
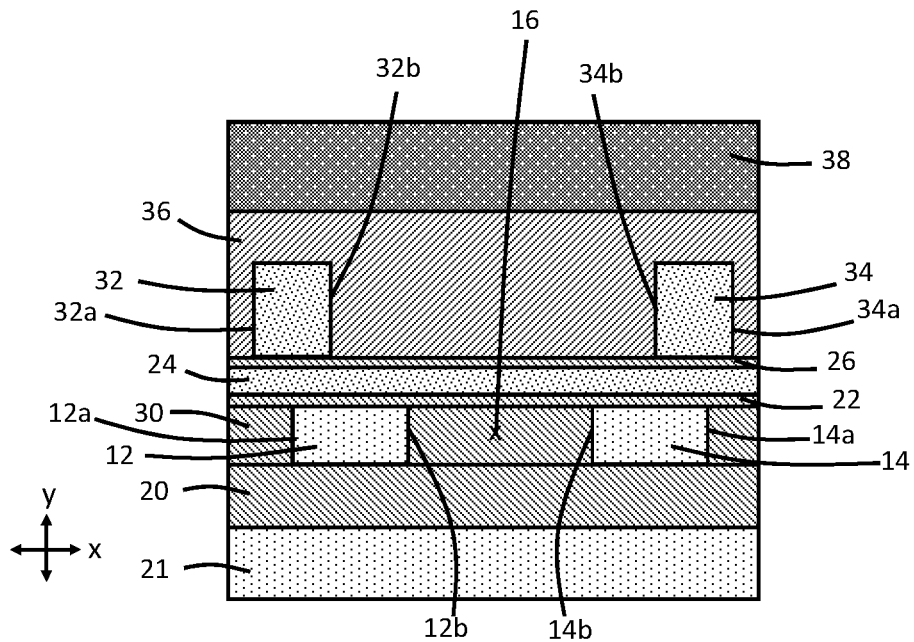

With reference to FIG. 7 in which like reference numerals refer to like features in FIG. 5 and in accordance with alternative embodiments of the invention, the waveguides 32, 34 may both be displaced outwardly (i.e., laterally in the x-direction) away from the centerline 16 in order to introduce a lateral misalignment between waveguide 12 and waveguide 32 and a lateral misalignment between waveguide 14 and waveguide 34. The positions of the waveguides 12, 14 are unchanged, but the centerline 33 (FIG. 4) of the waveguide 32 is spaced in a lateral direction from the centerline 16 by a new distance that is greater than the distance, S/2, and the centerline 35 (FIG. 4) of the waveguide 34 is spaced in a lateral direction from the centerline 16 by a new distance that is greater than the distance, S/2. In an embodiment, the width, w2, of the waveguides 32, 34 is maintained, and only the respective centerlines 33, 35 are shifted. The overlapping relationship between the waveguide 32 and the underlying waveguide 12 is maintained, and the overlapping relationship between the waveguide 34 and the underlying waveguide 14 is also maintained. Specifically, the side edge 32b of the waveguide 32 is arranged between the side edges 12a, 12b of the waveguide 12, and the side edge 34b of the waveguide 34 is arranged between the side edges 14a, 14b of the waveguide 14.

In an alternative embodiment, the waveguides 32, 34 may be displaced in different lateral directions relative to the centerline 16 in order to introduce a lateral misalignment between waveguide 12 and waveguide 32 and a lateral misalignment between waveguide 14 and waveguide 34. For example, the centerline 33 of the waveguide 32 may be spaced in a lateral direction from the centerline 16 by a distance that is less than the distance, S/2, and the centerline 35 of the waveguide 34 spaced in a lateral direction from the centerline 16 by a distance that is greater than the distance, S/2. As another example, the centerline 33 of the waveguide 32 may be spaced in a lateral direction from the centerline 16 by a distance that is greater than the distance, S/2, and the centerline 35 of the waveguide 34 spaced in a lateral direction from the centerline 16 by a distance that is less than the distance, S/2.

Figure 8:
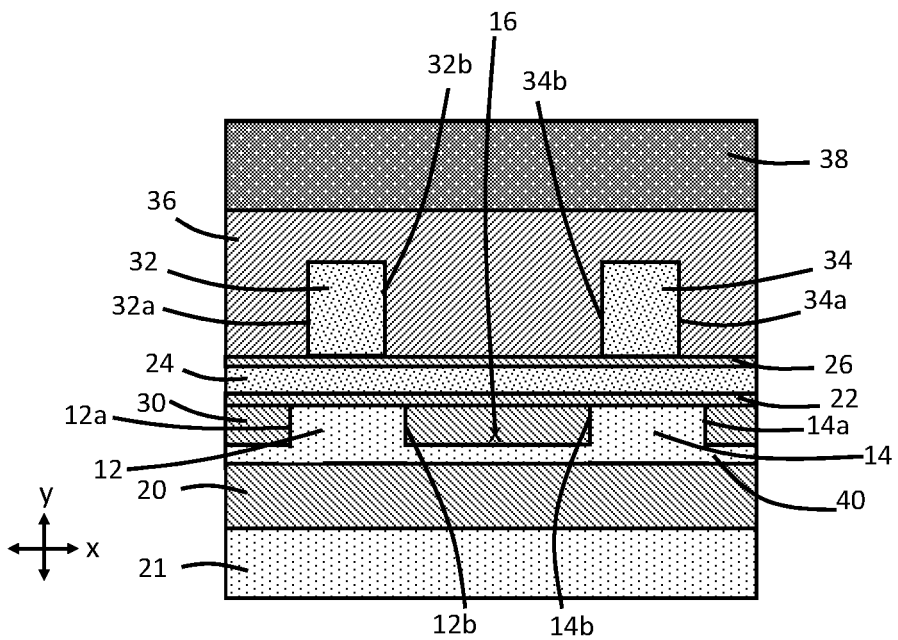

With reference to FIG. 8 in which like reference numerals refer to like features in FIG. 5 and in accordance with alternative embodiments of the invention, the etching process used to pattern the single-crystal semiconductor material to form the waveguides 12, 14 may be controlled such that a layer 40 of partially-etched single-crystal semiconductor material of the device layer is arranged on the BOX layer 20 and connects the waveguides 12, 14. The layer 40 has a thickness in the vertical direction (i.e., y-direction) that remains as a result of the partial etching, and that is less than the original thickness of the device layer. The structure 10 including the waveguides 12, 14 formed from partially-etched single-crystal semiconductor material may be modified to have a construction as shown in any of FIGS. 5-7. In an alternative embodiment, the waveguides 32, 34 may be formed from partially-etched dielectric material (e.g., silicon nitride).

Figure 9:
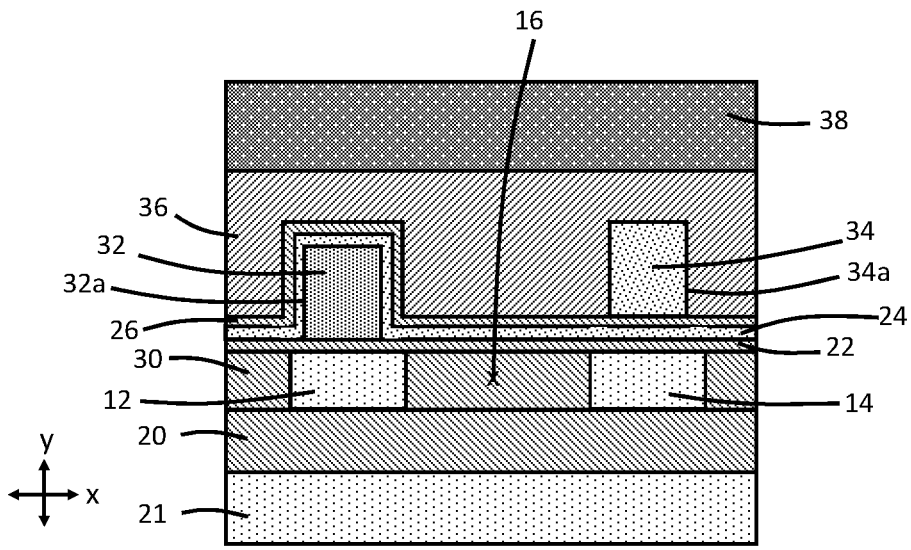

With reference to FIG. 9 in which like reference numerals refer to like features in FIG. 5 and in accordance with alternative embodiments of the invention, the waveguides 32, 34 may be composed of a material that is not a dielectric material. In an embodiment, the waveguides 32, 34 may be composed of a polycrystalline semiconductor material, such as polycrystalline silicon (polysilicon), deposited by chemical vapor deposition and patterned with a lithography and etching process to form the waveguides 32, 34. The structure 10 including the waveguides 32, 34 composed of polycrystalline semiconductor material may be modified to have a construction as shown in any of FIGS. 5-7. In an alternative embodiment, the waveguides 12, 14 may be formed from partially-etched single-crystal semiconductor material as shown and described in the context of FIG. 8.

Figure 10:
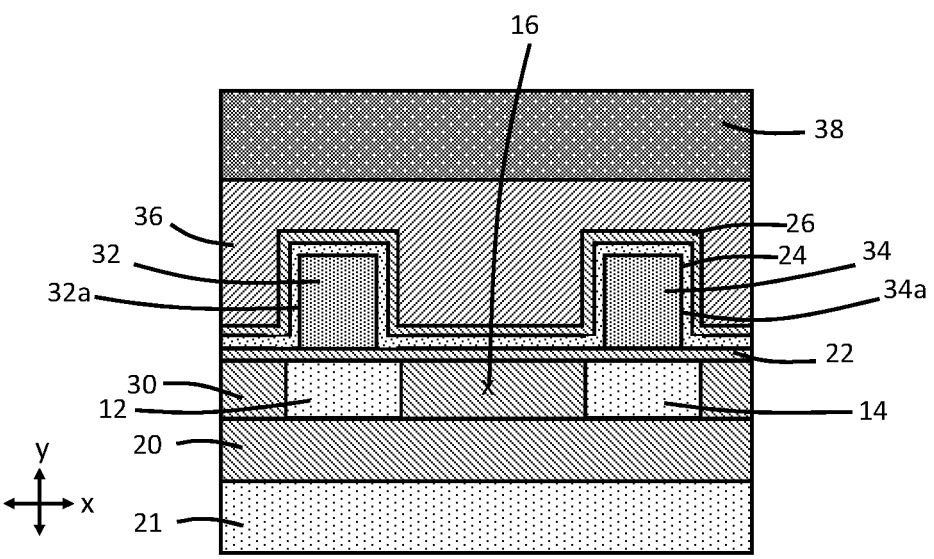

With reference to FIG. 10 in which like reference numerals refer to like features in FIG. 5 and in accordance with alternative embodiments of the invention, the waveguides 32, 34 may be composed of different materials. In an embodiment, the waveguide 32 may be composed of polycrystalline semiconductor material (e.g., polysilicon) deposited by chemical vapor deposition and patterned with a lithography and etching process to form the waveguide 32. In an embodiment, the waveguide 34 may be composed of a dielectric material (e.g., silicon nitride) deposited by chemical vapor deposition and patterned with a lithography and etching process to form the waveguide 34. The waveguide 34 may be formed after forming the waveguide 32 and the dielectric layers 24, 26. The structure 10 including the waveguides 32, 34 composed of different materials may be modified to have a construction as shown in any of FIGS. 5-7. In an alternative embodiment, the waveguides 12, 14 may be formed from partially-etched single-crystal semiconductor material as shown and described in the context of FIG. 8. In an alternative embodiment, the waveguide 34 may be formed from partially-etched dielectric material (e.g., silicon nitride).

Figure 11:
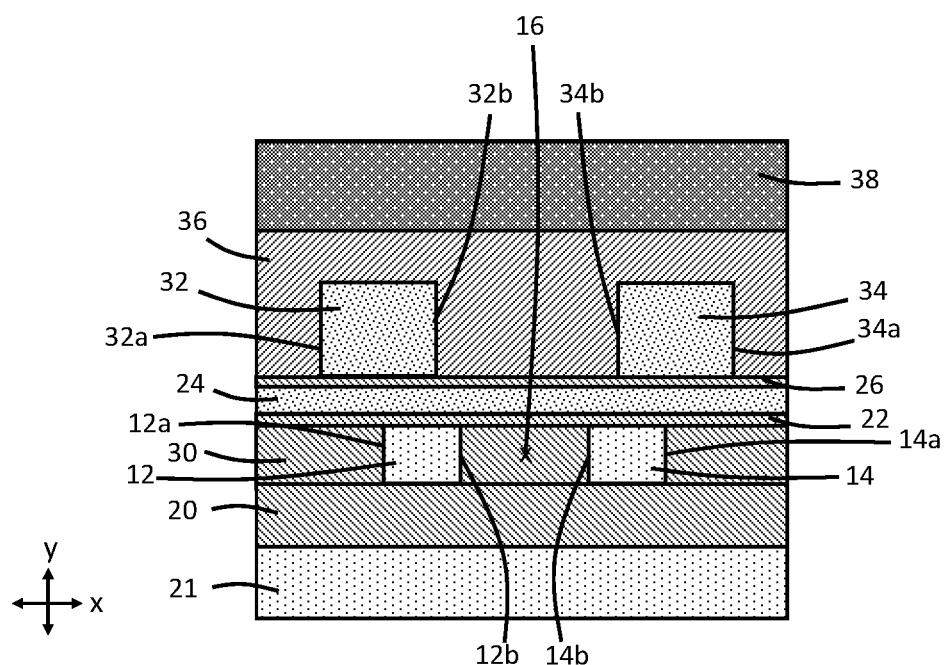

With reference to FIG. 11 in which like reference numerals refer to like features in FIG. 5 and in accordance with alternative embodiments of the invention, the waveguides 12, 14 may both be displaced inwardly (i.e., laterally in the x-direction) toward the centerline 16 in order to introduce a lateral misalignment between waveguide 12 and waveguide 32 and a lateral misalignment between waveguide 14 and waveguide 34. The overlapping relationship between the waveguide 32 and the underlying waveguide 12 is maintained, and the overlapping relationship between the waveguide 34 and the underlying waveguide 14 is also maintained. Specifically, the side edge 12a of the waveguide 12 is arranged between the side edges 32a, 32b of the waveguide 32 and the side edge 14a of the waveguide 34 is arranged between the side edge 14b of the waveguide 12 and the centerline 16. The positions of the waveguides 12, 14 are unchanged, but the centerline 33 of the waveguide 32 is spaced in a lateral direction from the centerline 16 by a new distance that is less than the distance, S/2, and the centerline 35 of the waveguide 34 is spaced in a lateral direction from the centerline 16 by a new distance that is less than the distance, S/2. In an alternative embodiment, the waveguides 12, 14 may both be displaced outwardly (i.e., laterally in the x-direction) away from the centerline 16 in order to introduce a lateral misalignment between waveguide 12 and waveguide 32 by a distance that is greater than the distance, S/2, and a lateral misalignment between waveguide 14 and waveguide 34 by a distance that is greater than the distance, S/2. In an alternative embodiment, one of the waveguides 12, 14 may be displaced inwardly toward the centerline 16 and the other of the waveguides 12, 14 may be displaced outwardly away from the centerline 16 in order to introduce a lateral misalignment between waveguide 12 and waveguide 32 and a lateral misalignment between waveguide 14 and waveguide 34. In an alternative embodiment, the waveguides 12, 14 may be formed from partially-etched single-crystal semiconductor material as shown and described in the context of FIG. 8.

References herein to terms such as "vertical", "horizontal", "lateral", etc. are made by way of example, and not by way of limitation, to establish a frame of reference. Terms such as "horizontal" and "lateral" refer to a direction in a plane parallel to a top surface of a semiconductor substrate, regardless of its actual three-dimensional spatial orientation. Terms such as "vertical" and "normal" refer to a direction perpendicular to the "horizontal" direction. Terms such as "above" and "below" indicate positioning of elements or structures relative to each other and/or to the top surface of the semiconductor substrate as opposed to relative elevation.

A feature "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonic chip, the structure comprising:
    a first waveguide;
    a second waveguide spaced in a lateral direction from the first waveguide;
    a third waveguide spaced in a vertical direction from the first waveguide, the vertical direction transverse to the lateral direction, and the third waveguide arranged in the lateral direction to provide a first overlapping relationship with the first waveguide;
    a fourth waveguide spaced in the vertical direction from the second waveguide, the fourth waveguide arranged in the lateral direction to provide a second overlapping relationship with the second waveguide; and
    a first dielectric layer arranged between the first waveguide and the third waveguide and between the second waveguide and the fourth waveguide,
    wherein the first waveguide, the second waveguide, the third waveguide, the fourth waveguide, and the first dielectric layer are located on the photonic chip, the first waveguide and the second waveguide are each comprised of single-crystal silicon, the first waveguide and the second waveguide each have a first width, the first waveguide and the second waveguide are configured to communicate optical signals on the photonic chip, and the third waveguide and the fourth waveguide are dummy structures configured to reduce optical crosstalk between the first waveguide and the second waveguide.

2. The structure of claim 1 wherein the third waveguide and the fourth waveguide are comprised of silicon nitride.

3. The structure of claim 1 wherein the third waveguide and the fourth waveguide are comprised of different materials.

4. The structure of claim 1 wherein the third waveguide is comprised of silicon nitride, and the fourth waveguide is comprised of polycrystalline silicon.

5. The structure of claim 1 wherein the third waveguide and the fourth waveguide each have a second width, and the first width is less than the second width.

6. The structure of claim 5 wherein the first waveguide has a centerline and the second waveguide has a centerline spaced in the lateral direction from the centerline of the first waveguide by a first distance, the third waveguide has a centerline and the fourth waveguide has a centerline spaced in the lateral direction from the centerline of the third waveguide by a second distance, and the first distance is equal to the second distance.

7. The structure of claim 6 wherein the third waveguide has a first side edge and a second side edge, the fourth waveguide has a first side edge and a second side edge, the first waveguide is arranged in the lateral direction between the first side edge of the third waveguide and the second side edge of the third waveguide, and the second waveguide is arranged in the lateral direction between the first side edge of the fourth waveguide and the second side edge of the fourth waveguide.

8. The structure of claim 5 wherein the first waveguide has a centerline and the second waveguide has a centerline spaced in the lateral direction from the centerline of the first waveguide by a first distance, the third waveguide has a centerline and the fourth waveguide has a centerline spaced in the lateral direction from the centerline of the third waveguide by a second distance, and the first distance is greater than the second distance.

9. The structure of claim 8 wherein the first waveguide has a side edge, the second waveguide has a side edge, the third waveguide has a first side edge and a second side edge, the fourth waveguide has a first side edge and a second side edge, the side edge of the first waveguide is arranged in the lateral direction between the first side edge of the third waveguide and the second side edge of the third waveguide, and the side edge of the second waveguide is arranged in the lateral direction between the first side edge of the fourth waveguide and the second side edge of the fourth waveguide.

10. The structure of claim 8 wherein the centerline of the third waveguide is arranged directly over the centerline of the first waveguide, and the centerline of the fourth waveguide is arranged directly over the centerline of the second waveguide.

11. The structure of claim 5 wherein the first waveguide has a centerline and the second waveguide has a centerline spaced in the lateral direction from the centerline of the first waveguide by a first distance, the third waveguide has a centerline and the fourth waveguide has a centerline spaced in the lateral direction from the centerline of the third waveguide by a second distance, and the first distance is less than the second distance.

12. The structure of claim 11 wherein the first waveguide has a side edge, the second waveguide has a side edge, the third waveguide has a first side edge and a second side edge, the fourth waveguide has a first side edge and a second side edge, the side edge of the first waveguide is arranged in the lateral direction between the first side edge of the third waveguide and the second side edge of the third waveguide, and the side edge of the second waveguide is arranged in the lateral direction between the first side edge of the fourth waveguide and the second side edge of the fourth waveguide.

13. The structure of claim 11 wherein the centerline of the third waveguide is arranged directly over the centerline of the first waveguide, and the centerline of the fourth waveguide is arranged directly over the centerline of the second waveguide.

14. The structure of claim 1 further comprising:
   a semiconductor substrate; and
   a second dielectric layer over the semiconductor substrate,
   wherein the second dielectric layer is located in the vertical direction between the semiconductor substrate and the first waveguide, and the second dielectric layer is located in the vertical direction between the semiconductor substrate and the second waveguide.

15. A method of forming a structure for a photonic chip, the method comprising:
   forming a first waveguide and a second waveguide spaced in a lateral direction from the first waveguide;
   forming a dielectric layer arranged over the first waveguide and the second waveguide; and
   forming a third waveguide spaced in a vertical direction from the first waveguide and a fourth waveguide spaced in the vertical direction from the second waveguide,
   wherein the vertical direction is transverse to the lateral direction, the first waveguide and the second waveguide are comprised of single-crystal silicon, the dielectric layer is arranged between the first waveguide and the third waveguide and between the second waveguide and the fourth waveguide, the first waveguide, the second waveguide, the third waveguide, the fourth waveguide, and the dielectric layer are located on the photonic chip, the third waveguide is arranged in the lateral direction to provide a first overlapping relationship with the first waveguide, the fourth waveguide is arranged in the lateral direction to provide a second overlapping relationship with the second waveguide, the first waveguide and the second waveguide each have a first width, the first waveguide and the second waveguide are configured to communicate optical signals on the photonic chip, and the third waveguide and the fourth waveguide are dummy structures configured to reduce optical crosstalk between the first waveguide and the second waveguide.

16. The method of claim 15 wherein forming the first waveguide and the second waveguide spaced in the lateral direction from the first waveguide comprises:
   patterning a device layer of a silicon-on-insulator wafer with a lithography and etching process that etches the device layer to form the first waveguide and the second waveguide.

17. The method of claim 15 wherein the third waveguide and the fourth waveguide each have a second width, and the first width is less than the second width.

18. The method of claim 17 wherein the first waveguide has a centerline and the second waveguide has a centerline separated from the centerline of the first waveguide by a first distance, the third waveguide has a centerline and the fourth waveguide has a centerline separated from the centerline of the third waveguide by a second distance, and the first distance is equal to the second distance.

19. The method of claim 17 wherein the first waveguide has a centerline and the second waveguide has a centerline separated from the centerline of the first waveguide by a first distance, the third waveguide has a centerline and the fourth waveguide has a centerline separated from the centerline of the third waveguide by a second distance, and the first distance is greater than the second distance.

20. The method of claim 17 wherein the first waveguide has a centerline and the second waveguide has a centerline separated from the centerline of the first waveguide by a first distance, the third waveguide has a centerline and the fourth waveguide has a centerline separated from the centerline of the third waveguide by a second distance, and the first distance is less than the second distance.

* * * * *